United States Patent
Gramlich et al.

(10) Patent No.: US 11,697,716 B2
(45) Date of Patent: Jul. 11, 2023

(54) PROCESS FOR PRODUCING A POLYAMIDE POWDER BY PRECIPITATION

(71) Applicant: BASF SE, Ludwigshafen am Rhein (DE)

(72) Inventors: Simon Gramlich, Ludwigshafen am Rhein (DE); Thomas Meier, Ludwigshafen am Rhein (DE); Claus Gabriel, Ludwigshafen am Rhein (DE); Natalie Beatrice Janine Herle, Ludwigshafen am Rhein (DE)

(73) Assignee: BASF SE (Ellwanger & Baier Patentanwälte), Ludwigshafen am Rhein (DE)

( * ) Notice: Subject to any disclaimer, the term of this patent is extended or adjusted under 35 U.S.C. 154(b) by 890 days.

(21) Appl. No.: 16/482,490

(22) PCT Filed: Jan. 25, 2018

(86) PCT No.: PCT/EP2018/051860
§ 371 (c)(1),
(2) Date: Jul. 31, 2019

(87) PCT Pub. No.: WO2018/141631
PCT Pub. Date: Aug. 9, 2018

(65) Prior Publication Data
US 2020/0010627 A1 Jan. 9, 2020

(30) Foreign Application Priority Data
Feb. 1, 2017 (EP) .................................. 17154213

(51) Int. Cl.
*C08J 3/14* (2006.01)
*B33Y 40/00* (2020.01)
(Continued)

(52) U.S. Cl.
CPC ............... *C08J 3/14* (2013.01); *B29C 64/314* (2017.08); *B33Y 40/00* (2014.12); *B33Y 70/00* (2014.12);
(Continued)

(58) Field of Classification Search
CPC .......... C08J 3/14; C08J 3/203; C08J 2377/02; B33Y 40/00; B33Y 70/00; B33Y 10/00;
(Continued)

(56) References Cited

U.S. PATENT DOCUMENTS 5,066,445 A * 11/1991 Dunlap ..................... B29B 9/06
264/331.12
6,136,948 A 10/2000 Dickens, Jr. et al.
(Continued)

FOREIGN PATENT DOCUMENTS

CA 3012952 A1 8/2017
CA 3013565 A1 8/2017
(Continued)

OTHER PUBLICATIONS

"Naik et al.; Melamine integrated metal phosphates as non-halogenated flame retardants: Synergism with aluminium phosphinate for flame retardancy in glass fiber reinforced polyamide 66; Polymer Degradation and Stability, vol. 98, pp. 2653-2662, Oct. 9, 2013". (Year: 2013).*
(Continued)

*Primary Examiner* — Matthew J Daniels
*Assistant Examiner* — Gregory C. Grosso
(74) *Attorney, Agent, or Firm* — Faegre Drinker Biddle & Reath LLP (57) ABSTRACT

The present invention relates to a process for producing a polyamide powder (PP) comprising at least one semicrystalline polyamide (P) and at least one additive (A). The semicrystalline polyamide (P) and the at least one additive
(Continued)

(A) are initially compounded with one another in an extruder and subsequently introduced into a solvent (SV) in which the at least one semicrystalline polyamide (P) then crystallizes to obtain the polyamide powder (PP). The present invention further relates to the thus obtainable polyamide powder (PP) and to the use of the polyamide powder (PP) as sintering powder (SP) and also to a process for producing a shaped body by selective laser sintering of a polyamide powder (PP).

15 Claims, 1 Drawing Sheet

(51) Int. Cl.
  *B33Y 70/00*  (2020.01)
  *B29C 64/314*  (2017.01)
  *C08J 3/20*  (2006.01)
  *B33Y 10/00*  (2015.01)
  *B29C 64/153*  (2017.01)
  *B29K 77/00*  (2006.01)

(52) U.S. Cl.
  CPC ............ *C08J 3/203* (2013.01); *B29C 64/153* (2017.08); *B29K 2077/00* (2013.01); *B33Y 10/00* (2014.12); *C08J 2377/02* (2013.01)

(58) Field of Classification Search
  CPC .. B29C 64/314; B29C 64/153; B29K 2077/00
  USPC .......................................... 504/606; 524/606
  See application file for complete search history.

(56) References Cited

U.S. PATENT DOCUMENTS

| | | |
|---|---|---|
| 7,148,286 B2 | 12/2006 | Baumann et al. |
| 7,317,044 B2 | 1/2008 | Monsheimer et al. |
| 10,913,205 B2 * | 2/2021 | Feng ................... B29C 64/165 |
| 2004/0106691 A1 | 6/2004 | Monsheimer et al. |
| 2004/0138363 A1 | 7/2004 | Baumann et al. |
| 2005/0027047 A1 | 2/2005 | Monsheimer et al. |
| 2005/0027050 A1 | 2/2005 | Monsheimer et al. |
| 2012/0264877 A1 * | 10/2012 | Hager ...................... C08J 3/128 |
| | | 264/500 |
| 2019/0071568 A1 | 3/2019 | Gabriel et al. |
| 2019/0160737 A1 | 5/2019 | Gabriel et al. |
| 2019/0168450 A1 | 6/2019 | Gabriel et al. |
| 2019/0177537 A1 | 6/2019 | Gabriel et al. |
| 2019/0202102 A1 | 7/2019 | Puch et al. |
| 2019/0264029 A1 | 8/2019 | Lohwasser et al. |

FOREIGN PATENT DOCUMENTS

| | | |
|---|---|---|
| CA | 3014262 A1 | 8/2017 |
| CN | 1497017 A | 5/2004 |
| CN | 105694068 A | 6/2016 |
| EP | 1411087 A1 | 4/2004 |
| EP | 1505111 A1 | 2/2005 |
| EP | 2404955 A1 | 1/2012 |
| GB | 1113119 A | 5/1968 |
| JP | 2004-137503 A | 5/2004 |
| JP | 2004-175102 A | 6/2004 |
| JP | 2005-048186 A | 2/2005 |
| JP | 2005-048187 A | 2/2005 |
| JP | 2013-091316 A | 5/2013 |
| WO | WO-9606881 A2 | 3/1996 |
| WO | WO-2005085326 A1 | 9/2005 |
| WO | 2016/104140 A1 | 6/2016 |
| WO | WO-2017140764 A1 | 8/2017 |
| WO | WO-2017140773 A1 | 8/2017 |
| WO | WO-2017140779 A1 | 8/2017 |

OTHER PUBLICATIONS

Ye et al., "Practical Plastic Processing Technology", Jindun Press, 2000, pp. 48-50.
Zhu et al., "Rapid Prototyping and Rapid Manufacturing Technology", National Defense Industry Press, 2003, pp. 120-121.
International Search Report for PCT/EP2018/051860 dated Mar. 19, 2018.
Written Opinion of the International Searching Authority for PCT/EP2018/051860 dated Mar. 19, 2018.
English Translation of International Preliminary Report On Patentability for International Application No. PCT/EP2018/051860, dated Aug. 1, 2019.

* cited by examiner

PROCESS FOR PRODUCING A POLYAMIDE POWDER BY PRECIPITATION

CROSS-REFERENCE TO RELATED APPLICATIONS

This application is a national stage application (under 35 U.S.C. § 371) of PCT/EP2018/051860, filed Jan. 25, 2018, which claims benefit of European Application No. 17154213.7, filed Feb. 1, 2017, both of which are incorporated herein by reference in their entirety.

The present invention relates to a process for producing a polyamide powder (PP) comprising at least one semicrystalline polyamide (P) and at least one additive (A). The semicrystalline polyamide (P) and the at least one additive (A) are initially compounded with one another in an extruder and subsequently introduced into a solvent (SV) in which the at least one semicrystalline polyamide (P) then crystallizes to obtain the polyamide powder (PP). The present invention further relates to the thus obtainable polyamide powder (PP) and to the use of the polyamide powder (PP) as sintering powder (SP) and also to a process for producing a shaped body by selective laser sintering of a polyamide powder (PP).

The rapid provision of prototypes is a problem often addressed in very recent times. One process which is particularly suitable for this so-called "rapid prototyping" is selective laser sintering (SLS). This involves selectively irradiating a plastic powder in a chamber with a laser beam. The powder melts, the molten particles coalesce and resolidify. Repeated application of plastic powder and subsequent irradiation with a laser allows modeling of three-dimensional shaped bodies.

The process of selective laser sintering for producing shaped bodies from pulverulent polymers is described in detail in patent specifications U.S. Pat. No. 6,136,948 and WO 96/06881.

Polyamide powders in particular are suitable as sintering powders in selective laser sintering (SLS). The prior art describes the various polyamide powders that may be employed as sintering powders. The polyamide powders described in the prior art are typically non-colored or are colored by subsequent coloring.

The disadvantage of non-colored sintering powders is in particular that they are susceptible to discoloration and/or yellowing, in particular during the selective laser sintering process. Subsequently colored sintering powders are not through-colored which particularly in subsequent treatment of component parts produced from these sintering powders results in a nonuniform color impression.

Furthermore, the sintering powders for selective laser sintering described in the prior art often have only a low aging resistance and poor recycling characteristics. In particular, their thermooxidative stability is low so that upon repeated use they undergo yellowing and also polymer chain degradation and/or growth which manifests in a change in the viscosity of the sintering powder and in the mechanical properties of the component parts produced therefrom.

Furthermore, the sintering window of the sintering powder is of particular importance in the selective laser sintering. This should be as broad as possible in order to reduce warpage of components in the laser sintering operation. Particularly the subsequently colored sintering powders described in the prior art often exhibit a narrowed sintering window compared to the sintering window of the pure sintering powder.

The problem addressed by the present invention is accordingly that of providing a process for producing a polyamide powder (PP), wherein the polyamide powder (PP) should be particularly suitable for use as sintering powder (SP) in a selective laser sintering process. The abovementioned disadvantages of the processes and sintering powders described in the prior art should be absent or much reduced in the process and the polyamide powder (PP) obtainable therefrom. The process should additionally be as simple and inexpensive to perform as possible.

This problem is solved by a process for producing a polyamide powder (PP) comprising at least one semicrystalline polyamide (P) and at least one additive (A) selected from the group consisting of inorganic pigments and stabilizers, comprising the steps of a) compounding the at least one semicrystalline polyamide (P) and the at least one additive (A) in an extruder to obtain a compounded mixture (cM) comprising the at least one semicrystalline polyamide (P) and the at least one additive (A), b) extruding the compounded mixture (cM) obtained in step a) from the extruder to obtain an extruded mixture (eM) comprising the at least one semicrystalline polyamide (P) and the at least one additive (A), c) introducing the extruded mixture (eM) obtained in step b) into a solvent (SV) to obtain a first suspension (S1) comprising the extruded mixture (eM) and the solvent (SV), d) heating the first suspension (S1) obtained in step c) to a first temperature (T1) wherein the at least one semicrystalline polyamide (P) present in the extruded mixture (eM) dissolves in the solvent (SV) to obtain a mixture (G) comprising the at least one semicrystalline polyamide (P) dissolved in the solvent (SV) and the at least one additive (A), e) cooling the mixture (G) obtained in step d) to a second temperature (T2) wherein the at least one semicrystalline polyamide (P) crystallizes to obtain a second suspension (S2) comprising the polyamide powder (PP) suspended in the solvent (SV), f) separating the polyamide powder (PP) from the second suspension (S2) obtained in step e).

It was found that, surprisingly, the polyamide powder (PP) produced by the process according to the invention exhibits a particularly narrow particle size distribution and is in addition particularly suitable for use in a selective laser sintering process. Furthermore, the polyamide powder (PP) produced according to the invention is particularly storage stable and even after thermal aging in the laser sintering plant retains a high recyclability so that polyamide powder (PP) not melted in the production of a shaped body may be reused. In addition, even after several laser sintering cycles the polyamide powder (PP) according to the invention has similarly advantageous sintering properties as in the first cycle.

The polyamide powder (PP) according to the invention moreover exhibits very little discoloration, if any, even after several sintering cycles and has a sufficiently broadened sintering window ($W_{SP}$) so that a shaped body produced therefrom by selective laser sintering shows markedly reduced, if any, warpage.

The present invention is more particularly elucidated hereinbelow.

SEMICRYSTALLINE POLYAMIDE (P)

The polyamide powder (PP) produced in the process according to the invention comprises at least one semicrystalline polyamide (P).

In the context of the present invention "at least one semicrystalline polyamide (P)" means either precisely one semicrystalline polyamide (P) or else a mixture (blend) of two or more semicrystalline polyamides (P).

In the context of the present invention "semicrystalline" means that the polyamide has an enthalpy of fusion $\Delta H2_{(A)}$ of >45 J/g, preferably of >50 J/g and especially preferably of >55 J/g, in each case measured by means of differential scanning calorimetry (DSC) according to ISO 113574: 2014 at a heating rate of 20 K/min.

The at least one semicrystalline polyamide (P) moreover preferably has an enthalpy of fusion $\Delta H2_{(A)}$ of <200 J/g, particularly preferably of <175 J/g and especially preferably of <150 J/g, in each case measured by means of differential scanning calorimetry (DSC) according to ISO 11357-4: 2014 at a cooling rate of 20 K/min.

Suitable as at least one semicrystalline polyamide (P) are for example polyamides (P) which derive from lactams having 7 to 13 ring members. Also suitable as at least one semicrystalline polyamide (P) are polyamides obtained by reaction of dicarboxylic acids with diamines.

Polyamides deriving from lactams which may be mentioned are for example polyamides which derive from caprolactam, caprylolactam and/or laurolactam.

Suitable polyamides further include those obtainable from ω-aminoalkyl nitriles. A preferred ω-aminoalkyl nitrile is aminocapronitrile, which affords polyamide 6. Dinitriles may also be reacted with diamines. Preference is given here to adiponitrile and hexamethylenediamine which polymerize to afford polyamide 66. The polymerization of nitriles is preferably performed in the presence of water and is also known as direct polymerization.

In the case where as the at least one semicrystalline polyamide (P) polyamides obtainable from dicarboxylic acids and diamines are employed, dicarboxylic acid alkanes (aliphatic dicarboxylic acids) having 6 to 36 carbon atoms, preferably 6 to 12 carbon atoms and particularly preferably 6 to 10 carbon atoms may be employed. Aromatic dicarboxylic acids are also suitable.

Adipic acid, azelaic acid, sebacic acid, dodecanedioic acid and also terephthalic acid and/or isophthalic acid may be mentioned here for example as dicarboxylic acids.

Suitable diamines are for example alkanediamines having 4 to 36 carbon atoms, preferably alkanediamines having 6 to 12 carbon atoms, in particular alkanediamines having 6 to 8 carbon atoms, and aromatic diamines, for example m-xylylenediamine, di(4-aminophenyl)methane, di(4-aminocyclohexyl)methane, 2,2-di(4-aminophenyl)propane and 2,2-di(4-aminocyclohexyl)propane and also 1,5-diamino-2-methylpentane.

Preferred as the at least one semicrystalline polyamide (P) are polyhexamethyleneadipamide, polyhexamethylenesebacamide and polycaprolactam and also copolyamide 6/66, in particular having a proportion of 5% to 95% by weight of caprolactam units.

Also suitable are polyamides obtainable by copolymerization of two or more of the monomers recited hereinabove and hereinbelow or mixtures of a plurality of polyamides in any desired mixing ratio.

Suitable polyamides are accordingly aliphatic, semiaromatic or aromatic polyamides. The term "aliphatic polyamides" means that the polyamides are constructed exclusively of aliphatic monomers. The term "semiaromatic polyamides" means that the polyamides are constructed of both aliphatic and aromatic monomers. The term "aromatic polyamides" means that the polyamides are constructed exclusively from aromatic monomers.

The nonexclusive list which follows comprises preferred semicrystalline polyamides for use as the at least one semicrystalline polyamide (P) in the process according to the invention.

AB Polymers:

| | |
|---|---|
| PA 4 | pyrrolidone |
| PA 6 | ε-caprolactam |
| PA 7 | enantholactam |
| PA 8 | caprylolactam |

AA/BB Polymers:

| | |
|---|---|
| PA 46 | tetramethylenediamine, adipic acid |
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 6T | hexamethylenediamine, terephthalic acid |
| PA MXD6 | m-xylylenediamine, adipic acid |
| PA 6/6I | (see PA 6), hexamethylenediamine, isophthalic acid |
| PA 6/6T | (see PA 6 and PA 6T) |
| PA 6/66 | (see PA 6 and PA 66) |
| PA 6/12 | (see PA 6), laurylolactam |
| PA 66/6/610 | (see PA 66, PA 6 and PA 610) |
| PA 6I/6T/PACM | as PA 6I/6T and diaminodicyclohexylmethane |
| PA 6/6I6T | (see PA 6 and PA 6T), hexamethylenediamine, isophthalic acid |

The at least one semicrystalline polyamide (P) is preferably selected from the group consisting of PA 4, PA 6, PA 7, PA 8, PA 9, PA 11, PA 12, PA 46, PA 66, PA 69, PA 610, PA 612, PA 613, PA 1212, PA 1313, PA 6T, PA MXD6, PA 6/6T, PA 6/6I, PA 6/6I6T, PA 6.36, PA 6/66, PA 6/12, PA 66/6/610, PA PACM12, PA 6I/6T/PACM and copolyamides of two or more of the abovementioned polyamides.

The at least one semicrystalline polyamide (P) is particularly preferably selected from the group consisting of PA 6, PA 66, PA 610, PA 612, PA 6.36, PA 6/66, PA 6/6I6T, PA 6/6T and PA 6/6I.

The at least one semicrystalline polyamide (P) is especially preferably selected from the group consisting of PA 6, PA 66, PA 610, PA 6/66 and PA 6/6T.

The present invention accordingly also provides a process in which the at least one semicrystalline polyamide (B) is selected from the group consisting of PA 4, PA 6, PA 7, PA 8, PA 9, PA 11, PA 12, PA 46, PA 66, PA 69, PA 610, PA 612, PA 613, PA 1212, PA 1313, PA 6T, PA MXD6, PA 6/6T, PA 6/6I, PA 6/6I6T, PA 6.36, PA 6/66, PA 6/12, PA 66/6/610, PA PACM12, PA 6I/6T/PACM and copolyamides of two or more of the abovementioned polyamides.

The at least one semicrystalline polyamide (P) has a viscosity number $(VZ_{(P)})$ for example in the range from 70 to 350 ml/g, preferably of 70 to 240 ml/g. According to the invention determination of the viscosity number $(VZ_{(P)})$ of the at least one semicrystalline polyamide (P) is performed in a 0.5% by weight solution of the at least one semicrystalline polyamide (P) and in 96% by weight sulfuric acid at 25° C. according to ISO 307:2013-08.

The at least one semicrystalline polyamide (P) preferably has a weight-average molecular weight ($M_W$) in the range from 500 to 2 000 000 g/mol, particularly preferably in the range from 5 000 to 500 000 g/mol and especially preferably in the range from 10 000 to 100 000 g/mol. The weight-average molecular weight ($M_W$) is determined according to ASTM-D 4001.

The at least one semicrystalline polyamide (P) typically has a melting temperature ($T_{M(P)}$). The melting temperature ($T_{M(P)}$) of the at least one semicrystalline polyamide (P) is for example in the range from 70° C. to 300° C., preferably in the range from 180° C. to 295° C.

The melting temperature ($T_{M(P)}$) of the at least one semicrystalline polyamide (P) is determined by means of differential scanning calorimetry. To determine the melting temperature ($T_{M(P)}$) by means of differential scanning calorimetry (DSC) a heating run (H) and a cooling run (C) are typically measured. This affords a DSC diagram as shown by way of example in FIG. 1. The melting temperature ($T_{M(P)}$) is then to be understood as meaning the temperature at which the melting peak of the heating run (H) of the DSC diagram has a maximum. The melting temperature ($T_{M(P)}$) is thus different to the onset temperature of melting ($T_M^{onset}$) described hereinbelow. The melting temperature ($T_{M(P)}$) is typically above the onset temperature of melting ($T_M^{onset}$).

The at least one semicrystalline polyamide (P) typically also has a glass transition temperature ($T_{G(P)}$). The glass transition temperature ($T_{G(P)}$) of the at least one semicrystalline polyamide (P) is for example in the range from 0° C. to 110° C. and preferably in the range from 40° C. to 105° C. measured in a dry state.

In the context of the present invention "in a dry state" means that the at least one semicrystalline polyamide (P) comprises less than 3% by weight, preferably less than 1% by weight and especially preferably less than 0.5% by weight of solvent (SV), preferably water, in each case based on the total weight of the at least one semicrystalline polyamide (P).

For the solvent (SV) the elucidations and preferences concerning the solvent (SV) employed in step c) apply accordingly.

The glass transition temperature ($T_{G(P)}$) of the at least one semicrystalline polyamide (P) is determined by means of differential scanning calorimetry. According to the invention determination is achieved by measuring initially a first heating run (H1), then a cooling run (C) and subsequently a second heating run (H2) of a sample of the at least one semicrystalline polyamide (P) (starting weight about 8.5 g). The heating rate in the first heating run (H1) and in the second heating run (H2) is 20 K/min. The cooling rate in the cooling run (C) is likewise 20 K/min. A step is obtained in the region of the glass transition of the at least one semicrystalline polyamide (P) in the second heating run (H2) in the DSC diagram. The glass transition temperature ($T_{G(P)}$) of the at least one semicrystalline polyamide (P) corresponds to the temperature at half of the step height in the DSC diagram. This process for determination of the glass transition temperature ($T_G$) is known to those skilled in the art.

The semicrystalline polyamide (P) typically also has a crystallization temperature ($T_{C(P)}$) in the range from 130° C. to 250° C. The crystallization temperature ($T_{C(P)}$) of the semicrystalline polyamide (P) is preferably in the range from 145° C. to 245° C. and especially preferably in the range from 160° C. to 235° C.

The present invention accordingly also provides a process in which the polyamide powder (PP) has a crystallization temperature ($T_{C(P)}$) in the range from 135° C. to 260° C.

In the context of the present invention the crystallization temperature ($T_{C(P)}$) is likewise determined by means of differential scanning calorimetry (DSC). As described hereinabove this typically involves measuring a heating run (H) and a cooling run (C). This affords a DSC diagram as shown by way of example for the polyamide powder in FIG. 1. The crystallization temperature ($T_{C(P)}$) is then the temperature at the minimum of the crystallization peak of the DSC curve. The crystallization temperature ($T_{C(PP)}$) is thus different to the onset temperature of crystallization (($T_C^{onset}$)) described hereinbelow. The crystallization temperature ($T_{C(P)}$) is typically below the onset temperature of crystallization ($T_C^{onset}$).

Additive (A)

According to the invention the at least one additive (A) is selected from the group consisting of inorganic pigments and stabilizers.

In the context of the present invention "at least one additive (A)" means either precisely one additive (A) or else a mixture of two or more additives (A).

It is preferable to employ as at least one additive (A) two or more additives (A), wherein at least one of the additives (A) is selected from the group consisting of inorganic pigments and at least one of the additives (A) is selected from the group consisting of stabilizers.

The invention accordingly also provides a process in which as the at least one additive (A) two or more additives (A) are employed, wherein at least one of the two or more additives (A) is selected from the group consisting of inorganic pigments and at least one further of the two or more additives (A) is selected from the group consisting of stabilizers.

In the context of the present invention "stabilizers" is to be understood as meaning compounds which may be used as free-radical scavengers.

Preferred stabilizers are selected from the group consisting of sterically hindered phenols, sterically hindered amines, phosphites and copper stabilizers.

The present invention accordingly also provides a process in which the stabilizers are selected from the group consisting of sterically hindered phenols, sterically hindered amines, phosphites and copper stabilizers.

Suitable sterically hindered phenols are for example selected from the group consisting of N,N'-hexamethylenebis[3-(3,5-di-t-butyl-4-hydroxyphenyl)propionamide], N,N'-hexane-1,6-diylbis[3-(3,5-di-tert-butyl-4-hydroxyphenylpropionamide], pentaerythritol tetrakis(3-(3,5-di-tert-butyl-4-hydroxyphenyl)propionate) and octadecyl-3-(3,5-di-tert-butyl-4-hydroxyphenyl)propionate.

Suitable sterically hindered amines are for example selected from the group consisting of bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)-n-butyl-3,5-di-tert-butyl-4-hydroxybenzyl malonate, the condensation product of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1, 2,3,4-butane tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidin-2,5-dione, a mixture of 4-hexadecyloxy- and 4-stearyloxy-2,2,6,6-tetramethylpiperidine, the condensate of N,N'-bis(2,2,6,6-tetramethyl-4-piperidyl)hexamethylendiamine and 4-cyclohexylamino-2,6-dichloro-1,3,5-triazine, the condensate of 1,2-bis(3-aminopropylamino)ethane and 2,4,6-trichloro-1,3,5-triazine and 4-butylamino-2,2,6,6-tetramethylpiperidine (CAS Reg. No. [136504-96-6]), the condensate of 1,6-hexanediamine and 2,4,6-trichloro-1,3,5-triazine and N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, the reaction product of 7,7,9,9-tetramethyl-2-cycloundecyl-1-oxa-3,8-diaza-4-oxospiro-[4,5]decane and epichlorhydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, poly[methylpropyl-3-oxy-4-(2,2,6,6-tetramethyl-4-piperidyl)]siloxane, 2,4-bis[N-(1-cyclohexyloxy-2,2,6,6-tetramethylpiperidin-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis [(1-cyclohexyloxy-2,2,6,6-piperidin-4-yl)butylamino]-6-chloro-s-triazine with N,N'-bis(3-aminopropyl) ethylendiamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazin-3-one-4-yl)amino)-s-triazine.

Preferred copper stabilizers are compounds of mono- or divalent copper. Compounds of mono- or divalent copper are for example salts of mono- or divalent copper with inorganic or organic acids or mono- or dihydric phenols, oxides of mono- or divalent copper or complexes of copper salts with ammonia, amines, amides, lactams, cyanides or phosphines. Also suitable are Cu(I) or Cu(II) salts of hydrohalic acids, of hydrocyanic acids or the copper salts of the aliphatic carboxylic acids. It is particularly preferable when copper stabilizers are selected from the group consisting of CuCl, CuBr, CuI, CuCN, $Cu_2O$, $CuCl_2$, $CuSO_4$, CuO, copper(II) acetate and copper(II) stearate.

Suitable phosphites are for example selected from the group consisting of triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecylpentaerythritol diphosphite, bis(2,4-di-tert-butylphenyl) pentaerythritol diphosphite, bis(2,4-di-cumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, bis(2,4-di-tert-butyl-6-methylphenyl) methyl phosphite, bis(2,4-di-tert-butyl-6-methylphenyl) ethyl phosphite and 2,2',2''-nitrilo[triethyl-tris-3,3',5,5'-tetra-tert-butyl-1,1'-biphenyl-2,2'-diyl)phosphite].

The stabilizers are preferably selected from the group consisting of N,N'-hexane-1,6-diylbis[3-(3,5-di-tert-butyl-4-hydroxyphenylpropionamide] and tris(2,4-di-tert-butylphenyl)phosphite.

"Inorganic pigments" is to be understood as meaning inorganic colorants which are insoluble in the at least one semicrystalline polyamide (P).

The inorganic pigments are preferably selected from the group consisting of carbon black and metal oxides.

The present invention accordingly also provides a process in which organic pigments are selected from the group consisting of carbon black and metal oxides.

Carbon blacks having a pore volume (DBP dibutylphthalate absorption) according to DIN 53601 of at least 30 ml/100 g, preferably at least 50 ml/100 g, are suitable.

The DBP absorption rate is generally determined according to DIN 53601 or ASTM-D 2414 and represents a measure for the structure of the respective carbon black. Structure here means concatenation of primary carbon black particles to afford aggregates. To determine this parameter 10 g of carbon black which is initially charged in a kneader having a measurable force transfer (plastograph) is admixed dropwise with dibutyl phthalate until the maximum torque (wetting point of the carbon black) has been exceeded.

Carbon black preferably has a BET specific surface area according to ISO 4652 of at least 20 to 1000 $m^2/g$, preferably of 30 to 300 $m^2/g$.

Such carbon blacks are available for example under the Spezialschwarz 4 trade name from Evonik, under the Printex U trade name from Evonik, under the Printex 140 trade name from Evonik, under the Spezialschwarz 350 trade name from Evonik and under the Spezialschwarz 100 trade name from Evonik.

Suitable metal oxides are for example selected from the group consisting of iron-cobalt oxides, bismuth vanadates, ZnO and $TiO_2$.

Suitable metal oxides are for example obtainable under the trade name Sicopal Black K 0090 from BASF SE and under the trade name Sicopal Black K 0095 from BASF SE.

Step a)

In step a) the at least one semicrystalline polyamide (P) and the at least one additive (a) are compounded in an extruder to obtain a compounded mixture (cM). The compounded mixture (cM) comprises the at least one semicrystalline polyamide (P) and the at least one additive (A).

In the context of the present invention "compounding" is to be understood as meaning the mixing of the at least one semicrystalline polyamide (P) and the at least one additive (A).

The at least one semicrystalline polyamide (P) and the at least one additive (A) are typically compounded with one another in the amounts in which they are to be present in the compounded mixture (cM) obtained in step a) and in the extruded mixture (eM) obtained in step b).

Therefore typically in the range from 90% to 99.95% by weight of the at least one semicrystalline polyamide (P) and in the range from 0.05% to 10% by weight of the at least one additive (A) are compounded in each case based on the total weight of the at least one semicrystalline polyamide (P) and of the at least one additive (A).

Preferably in the range from 95% to 99.95% by weight of the at least one semicrystalline polyamide (P) and in the range from 0.05% to 5% by weight of the at least one additive (A) are compounded in each case based on the total weight of the at least one semicrystalline polyamide (P) and of the at least one additive (A).

Particularly preferably in the range from 98% to 99.95% by weight of the at least one semicrystalline polyamide (P) and in the range from 0.05% to 2% by weight of the at least one additive (A) are compounded in each case based on the total weight of the at least one semicrystalline polyamide (P) and of the at least one additive (A).

In a further embodiment of the present invention in step a) in the range from 60% to <95% by weight of the at least one semicrystalline polyamide (P) and in the range from >5% to 40% by weight of the at least one additive (A) are compounded in each case based on the total weight of the at least one semicrystalline polyamide (P) and of the at least one additive (A).

The sum of the percentages by weight of the at least one semicrystalline polyamide (P) and of the at least one additive (A) is typically 100%.

The at least one semicrystalline polyamide (P) and the at least one additive (A) may react with one another during the compounding in step a). It is preferable when the at least one semicrystalline polyamide (P) and the at least one additive (A) do not react with one another during the compounding in step a).

It will be appreciated that the percentages by weight of the at least one semicrystalline polyamide (P) and of the at least one additive (A) relate to the percentages by weight before any reaction between the at least one semicrystalline polyamide (P) and the at least one additive (A) has taken place.

Step a) may be performed at any desired temperature, the at least one semicrystalline polyamide (P) preferably being present in molten form at the temperatures at which step a) is performed.

"In molten form" means that the at least one semicrystalline polyamide (P) has a temperature above the melting temperature ($T_{M(P)}$) of the at least one semicrystalline polyamide (P). In the context of the invention "in molten form" thus means that step a) is performed at a temperature above the melting temperature ($T_{M(P)}$) of the at least one semicrystalline polyamide. If the at least one semicrystalline polyamide (P) is present in molten form then the at least one semicrystalline polyamide (P) is flowable.

"Flowable" means that the at least one semicrystalline polyamide (P) can be conveyed in the extruder and that the at least one semicrystalline polyamide (P) can be extruded from the extruder.

At the temperatures at which step a) is performed the at least one additive (A) may likewise be present in molten form. It is likewise possible that the at least one additive (A) is present in solid form at the temperatures at which step a) is performed.

"In molten form" then means that the at least one additive (A) has a temperature above the melting temperature ($T_{M(A)}$) of the at least one additive (A). Thus, "in molten form" then means that step a) is also performed at a temperature above the melting temperature ($T_{M(A)}$) of the at least one additive (A).

"In solid form" then means that the at least one additive (A) has a temperature below the melting temperature ($T_{M(A)}$) of the at least one additive (A). Thus, "in solid form" then means that step a) is performed at a temperature below the melting temperature ($T_{M(A)}$) of the at least one additive (A).

Step a) is performed for example at a temperature in the range from 220° C. to 320° C., preferably in the range from 240° C. to 300° C. and especially preferably in the range from 270° C. to 290° C.

In the context of the present invention the temperature at which step a) is performed is to be understood as meaning the jacket temperature of the extruder.

The present invention accordingly also provides a process in which the jacket temperature of the heated housing of the extruder during the compounding in step a) is in the range from 220° C. to 320° C., preferably in the range from 240° C. to 300° C. and especially preferably in the range from 270° C. to 290° C.

The "jacket temperature of the extruder" is to be understood as meaning the temperature of the jacket of the extruder. The jacket temperature of the extruder is thus the temperature of the outer wall of the housing of the extruder.

The jacket temperature of the extruder may be higher than the temperature of the components present in the extruder (of the at least one semicrystalline polyamide (P) and of the at least one additive (A)) and it is likewise possible that the jacket temperature of the extruder is lower than the temperature of the components in the extruder. It is possible for example that the jacket temperature of the extruder is initially higher than the temperature of the components in the extruder when the components are being heated. When the components in the extruder are being cooled, it is possible that the jacket temperature of the extruder is lower than the temperature of the components in the extruder.

For compounding of the at least one semicrystalline polyamide (P) and of the at least one additive (A) in the extruder the at least one semicrystalline polyamide (P) and the at least one additive (A) may be supplied to the extruder by methods known to those skilled in the art. For example the at least one semicrystalline polyamide (P) may be supplied to the extruder in molten or in solid form. Likewise the at least one additive (A) may be supplied to the extruder in molten or in solid form.

When the at least one semicrystalline polyamide (P) is supplied to the extruder in solid form it may be supplied to the extruder for example as pellets and/or as powder. The at least one semicrystalline polyamide (P) may then be melted in the extruder. This embodiment is preferred.

Similarly, the at least one additive (A) may also be supplied to the extruder in solid form, for example as pellets or as a powder, preferably as a powder, and then optionally melted in the extruder.

It is furthermore possible that initially the at least one semicrystalline polyamide (P) is produced directly in the extruder, then the at least one additive (A) is supplied to the extruder and finally said additive is compounded with the semicrystalline polyamide (P) produced in the extruder.

Suitable extruders include all extruders known to those skilled in the art.

In step a) an added substance may additionally be compounded with the at least one semicrystalline polyamide (P) and the at least one additive (A). Suitable added substances are known to those skilled in the art and are for example talc, alkaline earth metal silicates, alkaline earth metal glycerophosphates, fillers, such as glass spheres, glass fibers, carbon fibers, nanotubes and chalk, and also impact-modified polymers, for example based on ethylene-propylene (EPM) or ethylene-propylene-diene (EPDM), rubbers or thermoplastic polyurethanes, flame retardants, plasticizers and/or adhesion promoters.

For example in the range of 0.1% to 50% by weight of an added substance, preferably in the range from 0.1% to 40% by weight and especially preferably in the range from 0.1% to 20% by weight of an added substance may be additionally compounded in each case based on the total weight of the at least one semicrystalline polyamide (P), of the at least one additive (A) and of the added substance.

It will be appreciated that when an added substance is additionally compounded the percentages by weight of the at least one semicrystalline polyamide (P) and/or of the at least one additive (A) are then also based on the total weight of the at least one semicrystalline polyamide (P), of the at least one additive (A) and of the added substance.

The sum of the percentages by weight of the at least one semicrystalline polyamide (P), of the at least one additive (A) and of the added substance is then typically 100% by weight.

In step a) the compounded mixture (cM) is obtained.

The compounded mixture (cM) obtained in step a) contains the at least one additive (A) typically dispersed in the at least one semicrystalline polyamide (P).

The at least one additive (A) then forms the disperse phase (inner phase) and the at least one semicrystalline polyamide (P) forms the dispersion medium (continuous phase). The compounded mixture (cM) comprises the at least one semicrystalline polyamide (P) and the at least one additive (A) typically in the same amounts in which the at least one semicrystalline polyamide (P) and the at least one additive (A) were compounded with one another.

The compounded mixture (cM) therefore typically comprises in the range from 95% to 99.95% by weight of the at least one semicrystalline polyamide (P) and in the range from 0.05% to 5% by weight of the at least one additive (A) in each case based on the sum of the percentages by weight of the at least one semicrystalline polyamide (P) and of the at least one additive (A), preferably based on the total weight of the compounded mixture (cM).

The compounded mixture (cM) preferably comprises in the range from 95% to 99.95% by weight of the at least one semicrystalline polyamide (P) and in the range from 0.05% to 5% by weight of the at least one additive (A) in each case based on the sum of the percentages by weight of the at least one semicrystalline polyamide (P) and of the at least one additive (A), preferably based on the total weight of the compounded mixture (cM).

The compounded mixture (cM) particularly preferably comprises in the range from 98% to 99.95% by weight of the at least one semicrystalline polyamide (P) and in the range from 0.05% to 2% by weight of the at least one additive (A) in each case based on the sum of the percentages by weight of the at least one semicrystalline polyamide (P) and of the at least one additive (A), preferably based on the total weight of the compounded mixture (cM).

In a further embodiment the compounded mixture (cM) comprises in the range from 60% to <95% by weight of the at least one semicrystalline polyamide (P) and in the range from >5% to 40% by weight of the at least one additive (A) in each case based on the sum of the percentages by weight of the at least one semicrystalline polyamide (P) and of the at least one additive (A), preferably based on the total weight of the compounded mixture (cM).

It will be appreciated that when in step a) an added substance was additionally compounded then the compounded mixture (cM) also comprises the added substance.

Step b)

According to the invention in step b) the compounded mixture (cM) obtained in step a) is extruded from the extruder to obtain an extruded mixture (eM). The extruded mixture (eM) comprises the at least one semicrystalline polyamide (P) and the at least one additive (A).

The extrusion of the compounded mixture (cM) obtained in step a) may be performed by any method known to those skilled in the art. The compounded mixture (cM) is typically extruded and pelletized in the course thereof. Processes for pelletizing are known to those skilled in the art. For example the compounded mixture (cM) may be extruded and cooled in a water bath and subsequently strand pelletized. Water pelletization is also possible. This is known per se to those skilled in the art. Cooling in a water bath with subsequent strand pelletization is preferred according to the invention.

The present invention accordingly also provides a process in which the compounded mixture (cM) obtained in step a) is in step b) extruded and cooled in a water bath and subsequently strand pelletized.

During extrusion of the compounded mixture (cM) the compounded mixture (cM) typically cools and therefore solidifies. The extruded mixture (eM) is therefore preferably present in solid form, especially preferably as pellets.

"In solid form" means that the compounded mixture (cM) has a temperature which is below the melting temperature ($T_{M(P)}$), preferably below the glass transition temperature ($T_{G(P)}$) of the at least one semicrystalline polyamide (P) present in the compounded mixture (cM).

For example in the extrusion during step b) the compounded mixture (cM) is pelletized to a particle size in the range from 0.5 to 6 mm, preferably in the range from 3 to 5 mm and especially preferably in the range from 4 to 5 mm.

The present invention accordingly also provides a process in which in the extrusion during step b) the compounded mixture (cM) is pelletized to a particle size in the range from 0.5 to 5 mm The extruded mixture (eM) obtained in step b) typically comprises the same amounts of the at least one semicrystalline polyamide (P) and of the at least one additive (A) as the compounded mixture (cM) obtained in step a).

In terms of the percentages by weight of the at least one semicrystalline polyamide (P) and of the at least one additive (A) and optionally of the added substance in the extruded mixture (eM) the previously described elucidations and preferences for the percentages by weight of the at least one semicrystalline polyamide and of the at least one additive (A) and optionally of the added substance in the compounded mixture (cM) therefore apply correspondingly.

The extruded mixture (eM) obtained in step b) for example comprises in the range from 0.05% to 5% by weight, preferably in the range from 0.05% to 2% by weight, of the at least one additive (A) based on the total weight of the extruded mixture (eM).

The present invention accordingly also provides a process in which the extruded mixture (eM) obtained in step b) comprises in the range from 0.05% to 6% by weight of the at least one additive (A) based on the total weight of the extruded mixture (eM).

In a further embodiment the extruded mixture (eM) obtained in step b) comprises in the range from >5% to 50% by weight of the at least one additive (A), preferably in the range from 10% to 40% by weight of the at least one additive (A) and especially preferably in the range from 10% to 30% by weight based on the total weight of the extruded mixture (eM).

The present invention accordingly also provides a process in which the extruded mixture (eM) obtained in step b) comprises in the range from >5% to 50% by weight of the at least one additive (A) based on the total weight of the extruded mixture (eM).

It will be appreciated that when the compounded mixture (cM) obtained in step a) additionally comprised the added substance then the extruded mixture (eM) also comprises this added substance.

Step c)

In step c) the extruded mixture (eM) obtained in step b) is introduced into a solvent (SV) to obtain a first suspension (S1). The first suspension (S1) comprises the extruded mixture (eM) and the solvent (SV).

The introduction of the extruded mixture (eM) obtained in step b) into the solvent (SV) may be performed by any method known to those skilled in the art. The extruded mixture (eM) obtained in step b) may be introduced into the solvent (SV) directly after pelletization thereof for example.

The temperature of the solvent (SV) during step c) is for example in the range from 5° C. to 100° C., preferably in the range from 10° C. to 70° C. and especially preferably in the range from 15° C. to 50° C.

The solvent (SV) may be stirred with a stirrer during the introduction of extruded mixture (eM).

Suitable stirrers include all stirrers known to those skilled in the art, for example propeller stirrers, anchor stirrers, cross-beam stirrers, with or without baffles.

The solvent (SV) may be stirred with a specific power input of the stirrer in the range from 100 to 500 W/m³ for example. It is stirred preferably with a specific power input in the range from 150 to 450 W/m³ and especially preferably with a specific power input of 200 to 400 W/m³. The specific power input is calculated according to the relation: p=P/V, wherein the power P may be calculated with P=k2*n^3*d^5*rho wherein k2 is a stirrer-specific constant (see source), n is the stirrer speed and d is the stirrer diameter and rho is the density of the medium and V is the stirred volume. Source: Ullmanns Encyclopedia of Industrial Chemistry, Marko Zlokarnik, 2012 Wiley-VCH Verlag GmbH & Co. KGaA, Weinheim, DOI: 10.1002/14356007.b02_25.

Suitable solvents (SV) are any solvents known to those skilled in the art in which the at least one semicrystalline polyamide (P) is soluble. The solvent (SV) is preferably selected from the group consisting of lactams, water and mixtures thereof.

The present invention accordingly also provides a process in which the solvent (SV) is selected from the group consisting of lactams, water and mixtures thereof.

According to the invention "lactam" is to be understood as meaning cyclic amides having 4 to 12 carbon atoms, preferably 6 to 12 carbon atoms, in the ring.

Suitable lactams are for example selected from the group consisting of 4-aminobutanolactam (γ-lactam; γ-butyrolactam; pyrrolidone), 5-aminopentanolactam (δ-lactam; δ-valerolactam; piperidone), 6-aminohexanolactam (ε-lactam; ε-caprolactam), 7-aminoheptanolactam (ζ-lactam; ζ-heptanolactam), 8-aminooctanolactam (η-lactam; η-octanolactam; caprylolactam), 9-nonanolactam (θ-lactam; θ-nonanolactam), 10-decanolactam (ω-decanolactam; capric lactam), 11-undecanolactam (ω-undecanolactam), and 12-dodecanolactam (ω-dodecanolactam; laurolactam).

The lactams may be unsubstituted or at least monosubstituted. In the case where at least monosubstituted lactams are employed these may bear one, two or more substituents at the carbon atoms of the ring.

Lactams are preferably unsubstituted.

12-dodecanolactam (ω-dodecanolactam) and/or ε-lactam (ε-caprolactam) is particularly preferred and ε-lactam (ε-caprolactam) as most preferred.

ε-Caprolactam is the cyclic amide of caproic acid. It is also called 6-aminohexanolactam, 6-hexanolactam or caprolactam. Its IUPAC name is "Acepan-2-one". Caprolactam has the CAS number 105-60-2 and the general formula $C_6H_{11}NO$. Processes for producing caprolactam are known to those skilled in the art.

The solvent (SV) employed is preferably a mixture of lactam and water. The solvent (SV) employed is preferably a mixture comprising lactam and water. Used as the solvent (SV) is for example a mixture comprising in the range from 30% to 60% by weight of lactam and in the range from 40% to 70% by weight of water based on the total weight of the mixture.

Preferably used as the solvent (SV) is a mixture of in the range from 30% to 50% by weight of lactam and in the range from 50% to 70% by weight of water in each case based on the total weight of the mixture.

Most preferably used as the solvent (SV) is a mixture of in the range from 35% to 45% by weight of lactam and in the range from 65% to 75% by weight of water in each case based on the total weight of the mixture.

The present invention accordingly also provides a process in which the solvent (SV) is a mixture of in the range from 30% to 60% by weight of lactam and in the range from 40% to 70% by weight of water in each case based on the total weight of the mixture.

The present invention accordingly also provides a process in which the solvent (SV) consists of a mixture of in the range from 30% to 60% by weight of lactam and in the range from 40% to 70% by weight of water in each case based on the total weight of the mixture.

In step c) a first suspension (S1) is obtained. The first suspension (S1) comprises the solvent (SV) as the dispersion medium (outer phase) and the extruded mixture (eM) as the disperse phase (inner phase).

The first suspension (S1) for example comprises in the range from 1% to 25% by weight of the extruded mixture (eM) and in the range from 75% to 99% by weight of the solvent (SV) based on the total weight of the first suspension (S1).

The first suspension (S1) preferably comprises in the range from 4% to 20% by weight of the extruded mixture (eM) and in the range from 80% to 96% by weight of the solvent (SV) based on the total weight of the first suspension (S1).

The first suspension (S1) most preferably comprises in the range from 7% to 15% by weight of the extruded mixture (eM) and in the range from 85% to 93% by weight of the solvent (SV) based on the total weight of the first suspension (S1).

The present invention accordingly also provides a process in which the first suspension (S1) obtained in step c) comprises in the range from 1% to 25% by weight of the extruded mixture (eM) and in the range from 75% to 99% by weight of the solvent (SV) based on the total weight of the first suspension (S1).

Step d)

In step d) the first suspension (S1) obtained in step c) is heated to a first temperature (T1). In the course of this the at least one semicrystalline polyamide (P) present in the extruded mixture (eM) dissolves in the solvent (SV) to obtain a mixture (G). The mixture (G) comprises the at least one semicrystalline polyamide (P) dissolved in the solvent (SV) and the at least one additive (A).

The first temperature (T1) to which the first suspension (S1) obtained in step c) is heated in step d) depends on the type of the solvent (SV) used, on the employed at least one semicrystalline polyamide (P) and on the concentration of the at least one semicrystalline polyamide (P) in the solvent (SV).

For example the first suspension (S1) is in step d) heated to a first temperature (T1) in the range from 140° C. to 200° C., preferably in the range from 150° C. to 195° C. and especially preferably in the range from 170° C. to 190° C.

The present invention accordingly also provides a process in which in step d) the first suspension (S1) obtained in step c) is heated to a first temperature (T1) in the range from 140° C. to 200° C.

The heating in step d) may be performed for example with a heating rate in the range from 0.5 to 5 K/min, preferably with a heating rate in the range from 1 to 4 K/min and especially preferably with a heating rate in the range from 2 to 3 K/min.

It is furthermore possible that the first suspension (S1) and/or the mixture (G) is held at the first temperature (T1) for a period in the range from 0.1 to 10 hours, preferably in the range from 0.1 to 5 hours.

It is additionally preferable for the first suspension (S1) obtained in step c) to be heated to the first temperature (T1) in at least two stages. For example the obtained first suspension (S1) is initially heated to a first temperature (T1-1) in the range from 140° C. to <170° C. and held at this temperature for 1 to 5 hours. Subsequently the first suspension (S1) is further heated to a second first temperature (T1-2) in the range from 170° C. to 190° C. for example and held there for 0.1 to 2 hours.

The present invention accordingly also provides a process in which the first suspension obtained in step c) is in step d) initially heated to a first first temperature (T1-1) in the range from 140° C. to <170° C. and subsequently heated to a second first temperature (T1-2) in the range from 170° C. to 190° C.

The heating in step d) may be performed by any method known to those skilled in the art.

The first suspension (S1) is preferably stirred with a stirrer during the heating in step d). Suitable stirrers include all stirrers known to those skilled in the art, for example propeller stirrers, anchor stirrers, cross-beam stirrers, with or without baffles.

If in step d) the first suspension (S1) is stirred, it is preferable when the specific power input of the stirrer into the first suspension (S1) is in the range from 100 to 500 W/m³, particularly preferably in the range from 150 to 450 W/m³ and especially preferably in the range from 200 to 400 W/m³. The specific power input is defined as described hereinabove.

The present invention accordingly also provides a process in which in step d) the first suspension (S1) is stirred with a stirrer during heating, wherein the specific power input of the stirrer into the first suspension (S1) is in the range from 100 to 500 W/m³.

During heating the at least one semicrystalline polyamide (P) dissolves in the solvent (SV). At the first temperature (T1) the at least one semicrystalline polyamide (P) is present fully dissolved in the solvent (SV). This means that the molecules of the at least one semicrystalline polyamide (P) are homogeneously and randomly distributed in the solvent (SV) and that the molecules of the at least one semicrystalline polyamide (P) cannot be separated by filtration.

The at least one additive (A) may likewise dissolve in the solvent (SV). It is furthermore possible that the at least one additive (A) does not dissolve in the solvent (SV).

If the at least one additive (A) does not dissolve in the solvent (SV) then the at least one additive (A) is present suspended in the solvent (SV) which comprises the at least one semicrystalline polyamide (P) in dissolved form. The at least one additive (A) then forms the disperse phase (inner phase) and the solvent (SV) comprising the at least one semicrystalline polyamide (P) in dissolved form then forms the dispersion medium (outer phase).

The optionally present added substances may likewise be present dissolved in the solvent (SV). It is likewise possible that the added substances do not dissolve in the solvent (SV) and are present suspended in the solvent (SV) comprising the at least one semicrystalline polyamide (P) in dissolved form.

Step e)

In step e) the mixture (G) obtained in step d) is cooled to a second temperature (T2). In the course of this the at least one semicrystalline polyamide (P) crystallizes to obtain a second suspension (S2) which comprises the polyamide powder (PP) suspended in the solvent (SV).

The second temperature (T2) to which the mixture (G) obtained in step d) is cooled in step e) depends on the type of the solvent (SV) used, on the at least one semicrystalline polyamide (P) and on the concentration of the at least one semicrystalline polyamide (P) in the solvent (SV). For example in step e) the mixture (G) obtained in step d) is cooled to a second temperature (T2) which is in the range from 100° C. to 140° C., preferably in the range from 105° C. to 135° C. and especially preferably in the range from 110° C. to 125° C.

The present invention accordingly also provides a process in which in step e) the mixture (G) obtained in step d) is cooled to a second temperature (T2) in the range from 100° C. to 140° C.

It will be appreciated that the second temperature (T2) to which the mixture (G) is cooled in step e) is below the first temperature (T1) to which the first suspension (S1) is heated in step d).

The cooling rate in step e) is for example in the range from 0.5 to 10° C./min, preferably in the range from 1 to 6° C./min and especially preferably in the range from 2 to 4° C./min.

It is possible that in step e) the mixture (G) is held at the second temperature (T2) for a period in the range from 0.1 to 2 hours, preferably in the range from 0.2 to 1.5 hours and in particular in the range from 0.3 to 1 hour.

The cooling may be performed by methods known to those skilled in the art.

The mixture (G) is preferably stirred with a stirrer during the cooling in step e). The specific power input of the stirrer into the mixture (G) is preferably the range from 100 to 500 W/m³, particularly preferably in the range from 150 to 450 W/m³ and especially preferably in the range from 200 to 400 W/m³. The specific power input of the stirrer is defined as described hereinabove.

The present invention accordingly also provides a process in which at least the mixture (G) is stirred with a stirrer during step e), wherein the specific power input of the stirrer into the mixture (G) is in the range from 100 to 500 W/m³.

During cooling the at least one semicrystalline polyamide (P) crystallizes out and the second suspension (S2) comprising the polyamide powder (PP) and the solvent (SV) is obtained.

The polyamide powder (PP) is more particularly described hereinbelow.

In the second suspension (S2) the polyamide powder (PP) forms the dispersed phase (inner phase) and the solvent (SV) forms the dispersion medium (continuous phase; outer phase). The second suspension (S2) typically comprises in the range from 1% to 25% by weight of the polyamide powder (PP) and in the range from 75% to 99% by weight of the solvent (SV) in each case based on the total weight of the second suspension (S2).

The second suspension preferably comprises in the range from 4% to 20% by weight of the polyamide powder (PP) and in the range from 80% to 90% by weight of the solvent (SV) based on the total weight of the second suspension (S2).

The second suspension (S2) most preferably comprises in the range from 7% to 15% by weight of the polyamide powder (PP) and in the range from 85% to 93% by weight of the solvent (SV) based on the total weight of the second suspension (S2).

Step f)

In step f) the polyamide powder (PP) is separated from the second suspension (S2) obtained in step e).

The removal of the polyamide powder (PP) may be performed by any processes known to those skilled in the art, for example by filtration and/or centrifugation. In step f) the polyamide powder (PP) is accordingly separated from the solvent (SV) of the second suspension (S2).

The thus obtained polyamide powder (PP) may optionally be subjected to further workup. In a preferred embodiment the polyamide powder (PP) is washed with water to remove from the polyamide powder (PP) any residual solvent (SV) present.

In a further preferred embodiment the polyamide powder (PP) is washed with water and then dried after the separation in step f).

This drying may be a thermal drying. Preferred thermal drying processes are for example drying in a fluidized bed supplied with hot air or drying under a nitrogen atmosphere and/or at reduced pressure at elevated temperatures, for example in the range from 50° C. to 80° C.

Polyamide Powder (PP)

The polyamide powder (PP) obtainable by the process according to the invention has a particularly low fines fraction, wherein the fines fraction is to be understood as meaning particles having a size of <20 μm.

For example the fines fraction in the polyamide powder (PP) produced according to the invention is <10% by weight, preferably <8% by weight and especially preferably <5% by weight in each case based on the total weight of the polyamide powder (PP).

The polyamide powder (PP) produced according to the invention moreover has a particularly narrow particle size distribution.

For example the polyamide powder (PP) has
a D10 in the range from 10 to 30 μm,
a D50 in the range from 25 to 70 μm and
a D90 in the range from 50 to 150 μm.

The polyamide powder (PP) according to the invention preferably has
a D10 in the range from 20 to 30 μm,
a D50 in the range from 40 to 60 μm and
a D90 in the range from 80 to 110 μm.

The present invention accordingly also provides a process in which the polyamide powder (PP) has
a D10 in the range from 10 to 30 μm,
a D50 in the range from 25 to 70 μm and
a D90 in the range from 50 to 150 μm.

In the context of the present invention, the "D10" is to be understood as meaning the particle size at which 10% by volume of the particles based on the total volume of the particles are smaller than or equal to the D10 and 90% by volume of the particles based on the total volume of the particles are larger than the D10. By analogy, the "D50" is to be understood as meaning the particle size at which 50% by volume of the particles based on the total volume of the particles are smaller than or equal to the D50 and 50% by volume of the particles based on the total volume of the particles are larger than the D50. Correspondingly, the "D90" is to be understood as meaning the particle size at which 90% by volume of the particles based on the total volume of the particles are smaller than or equal to the D90 and 10% by volume of the particles based on the total volume of the particles are larger than the D90.

To determine the particle sizes, the polyamide powder (PP) is suspended in a dry state by means of compressed air or in a solvent, for example water or ethanol, and this suspension is analyzed. The D10, D50 and D90 are determined by means of laser diffraction using a Malvern Mastersizer 3000. Evaluation is by means of Fraunhofer diffraction.

The polyamide powder (PP) according to the invention further has a particularly high bulk density, for example a bulk density in the range from 0.3 to 0.7 $g/cm^3$, preferably in the range from 0.4 to 0.65 $g/cm^3$ and especially preferably in the range from 0.45 to 0.6 $g/cm^3$.

The polyamide powder (PP) may comprise the at least one semicrystalline polyamide (P) and the at least one additive (A) in any desired amounts.

The polyamide powder (PP) typically comprises the at least one semicrystalline polyamide (P) and the at least one additive (A) in the amounts in which the at least one semicrystalline polyamide (P) and the at least one additive (A) were compounded in step a).

The polyamide powder (PP) for example comprises in the range from 95% to 99.95% by weight of the at least one semicrystalline polyamide and in the range from 0.05% to 5% by weight of the at least one additive (A) based on the total weight of the polyamide powder (PP).

The polyamide powder (PP) preferably comprises in the range from 98% to 99.95% by weight of the at least one semicrystalline polyamide (P) and in the range from 0.05% to 2% by weight of the at least one additive (A) in each case based on the total weight of the polyamide powder (PP).

In a further embodiment the polyamide powder (PP) comprises in the range from 60% to <95% by weight of the at least one semicrystalline polyamide (P) and in the range from >5% to 40% by weight of the at least one additive (A) in each case based on the total weight of the polyamide powder (PP).

In this embodiment the polyamide powder (PP) preferably comprises in the range from 95% to 99.95% by weight of the at least one semicrystalline polyamide (P) and in the range from 0.05% to 5% by weight of the at least one additive (A) in each case based on the total weight of the polyamide powder (PP).

In this embodiment the polyamide powder (PP) most preferably comprises in the range from 98% to 99.95% by weight of the at least one semicrystalline polyamide (P) and in the range from 0.05% to 2% by weight of the at least one additive (A) in each case based on the total weight of the polyamide powder (PP).

It will be appreciated that when in step a) an added substance was additionally compounded then the polyamide powder (PP) obtained in step f) also contains this added substance. The polyamide powder (PP) then typically comprises this added substance in the amounts in which it was compounded in step a).

The polyamide powder (PP) may moreover also contain residual solvent (SV).

"Residual" solvent (SV) is to be understood as meaning for example in the range from 0.01% to 5% by weight of the solvent, preferably in the range from 0.1% to 3% by weight and especially preferably in the range from 0.1% to 1% by weight of the solvent (SV) in each case based on the total weight of the polyamide powder (PP).

When the polyamide powder (PP) comprises in the range from >5% to 50% by weight of the at least one additive (A), preferably in the range from 10% to 40% by weight of the at least one additive (A) and especially preferably in the range from 10% to 30% by weight of the at least one additive (A) in each case based on the total weight of the polyamide powder (PP) then the polyamide powder (PP) is a so-called masterbatch. Such a masterbatch is typically diluted with further semicrystalline polyamide (P) before use for example in a selective laser sintering process and/or for producing shaped bodies. Such processes are known to the person skilled in the art.

In the polyamide powder (PP) the at least one additive (A) is typically present dispersed in the at least one semicrystalline polyamide (P). The at least one additive (A) then forms the disperse phase (inner phase) and the at least one semicrystalline polyamide (P) forms the dispersion medium (outer phase).

The polyamide powder (PP) typically has a melting temperature $(T_{M(PP)})$ in the range from 180° C. to 270° C. The melting temperature $(T_{M(PP)})$ of the polyamide powder (PP) is preferably in the range from 185° C. to 260° C. and especially preferably in the range from 190° C. to 245° C.

The present invention accordingly also provides a process in which the polyamide powder (PP) has a melting temperature $(T_{M(PP)})$ in the range from 180° C. to 270° C.

In the context of the present invention the melting temperature $(T_{M(PP)})$ of the polyamide powder (PP) is determined by means of differential scanning calorimetry (DSC). A heating run (H) and a cooling run (C) are typically measured. This affords a DSC diagram as shown by way of example in FIG. 1. The melting temperature $(T_{M(PP)})$ is then to be understood as meaning the temperature at which the melting peak of the heating run (H) of the DSC diagram has a maximum. The melting temperature $(T_{M(PP)})$ is thus different to the onset temperature of melting $(T_M^{onset})$ described hereinbelow. The melting temperature $(T_{M(PP)})$ is typically above the onset temperature of melting $(T_M^{onset})$.

The polyamide powder (PP) typically also has a crystallization temperature $(T_{C(PP)})$ in the range from 120° C. to 250° C. The crystallization temperature $(T_{C(PP)})$ of the polyamide powder (PP) is preferably in the range from 130° C. to 240° C. and especially preferably in the range from 140° C. to 235° C.

The present invention accordingly also provides a process in which the polyamide powder (PP) has a crystallization temperature $(T_{C(PP)})$ in the range from 120° C. to 250° C.

Figure 1:
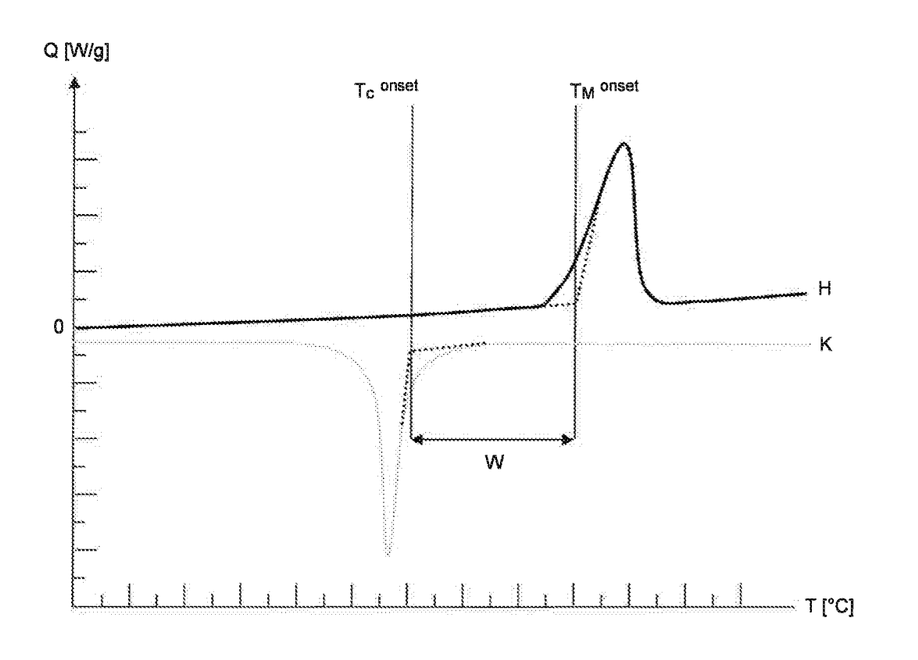
FIG. 1 illustrates a DSC diagram comprising a heating run (H) and a cooling run (C).

In the context of the present invention the crystallization temperature $(T_{C(PP)})$ is likewise determined by means of differential scanning calorimetry (DSC). As described hereinabove this typically involves measuring a heating run (H) and a cooling run (C). A DSC diagram as shown by way of example in FIG. 1 is obtained. The crystallization temperature $(T_{C(PP)})$ is then the temperature at the minimum of the crystallization peak of the DSC curve. The crystallization temperature $(T_{C(PP)})$ is thus different to the onset temperature of crystallization $(T_C^{onset})$ described hereinbelow.

The polyamide powder (PP) typically also has a glass transition temperature $(T_{G(P)})$. The glass transition temperature $(T_{G(PP)})$ of the polyamide powder (PP) is typically in the range from 0° C. to 110° C., preferably in the range from 40° C. to 105° C. and especially preferably in the range from 40° C. to 105° C.

The glass transition temperature $(T_{G(PP)})$ of the polyamide powder (PP) is determined by means of differential scanning calorimetry. According to the invention determination is achieved by measuring initially a first heating run (H1), then a cooling run (C) and subsequently a second heating run (H2) on a sample of the polyamide powder (PP) (starting weight about 8.5 g). The heating rate in the first heating run (H1) and in the second heating run (H2) is 20 K/min; the cooling rate in the cooling run (C) is likewise 20 K/min. A step is obtained in the region of the glass transition of the polyamide powder (PP) in the second heating run (H2) in the DSC diagram. The glass transition temperature $(T_{G(PP)})$ of the polyamide powder (PP) corresponds to the temperature at half of the step height in the DSC diagram. This process for determination of the glass transition temperature is known to those skilled in the art.

The polyamide powder (PP) typically also has a sintering window $(W_{PP})$. The sintering window $(W_{PP})$ is as more particularly elucidated hereinbelow the difference between the onset temperature of melting $(T_M^{onset})$ and the onset temperature of crystallization $(T_C^{onset})$. The onset temperature of melting $(T_M^{onset})$ and the onset temperature of crystallization $(T_C^{onset})$ are determined as described hereinbelow.

The sintering window $(W_{PP})$ of the polyamide powder (PP) is preferably in the range from 15 to 40 K (Kelvin), particularly preferably in the range from 20 to 35 K and especially preferably in the range from 20 to 30 K.

The present invention accordingly also provides a process in which the polyamide powder (PP) has a sintering window $(W_{PP})$, wherein the sintering window $(W_{PP})$ is the difference between the onset temperature of melting $(T_M^{onset})$ and the onset temperature of crystallization $(T_C^{onset})$ and wherein the sintering window $(W_{PP})$ is in the range from 15 to 40 K.

The present invention accordingly also provides a polyamide powder (PP) obtainable by the process according to the invention.

On account of the properties of the polyamide powder (PP) described hereinabove the polyamide powder (PP) according to the invention is particularly suitable as a sintering powder (SP).

The present invention accordingly also provides for the use of a polyamide powder (PP) according to the invention as a sintering powder (SP).

The present invention further provides a process for producing a shaped body by selective laser sintering of a polyamide powder (PP) according to the invention.

Selective Laser Sintering

The process of selective laser sintering is known per se to those skilled in the art, for example from U.S. Pat. No. 6,136,948 and WO 96/06881.

In laser sintering a first layer of a sinterable powder is arranged in a powder bed and subjected to local momentary irradiation with a laser beam. Only the portion of the sinterable powder irradiated with the laser beam is selectively melted (selective laser sintering). The molten sinterable powder coalesces and thus forms a homogeneous melt in the irradiated region. The region subsequently cools down again and the homogeneous melt resolidifies. The powder bed is then lowered by the layer thickness of the first layer, and a second layer of the sinterable powder is applied and selectively irradiated and melted with the laser. This joins the upper second layer of the sinterable powder with the lower first layer; in addition the particles of the sinterable powder within the second layer are also joined to one another by the melting. By repeating the lowering of the powder bed, the application of the sinterable powder and the melting of the sinterable powder, three-dimensional shaped bodies may be produced. The selective irradiation of certain locations with the laser beam makes it possible to produce shaped bodies also having cavities for example. No additional support material is necessary since the unmolten sinterable powder itself acts as a support material.

All powders known to those skilled in the art and meltable by irradiation with a laser are suitable as sinterable powder in selective laser sintering. According to the invention the sinterable powder employed in the selective laser sintering is the polyamide powder (PP) also known as sintering powder (SP).

In the context of the present invention the terms "sinterable powder", "polyamide powder (PP)" and "sintering powder (SP)" may be used synonymously and then have the same meaning.

Suitable lasers for selective laser sintering are known to those skilled in the art and include for example fiber lasers, Nd:YAG lasers (neodymium-doped yttrium aluminum garnet laser) and carbon dioxide lasers.

Of particular importance in the selective laser sintering process is the melting range of the sinterable powder, the so-called "sintering window (W)". When the sinterable powder is the polyamide powder (PP) according to the invention the sintering window (W) is referred to in the context of the present invention as the "sintering window $(W_{PP})$" of the polyamide powder (PP).

The sintering window (W) of a sinterable powder may be determined by differential scanning calorimetry (DSC) for example.

In differential scanning calorimetry, the temperature of a sample, i.e. in the present case a sample of the sinterable powder, and the temperature of a reference are altered linearly over time. To this end, heat is supplied to/removed from the sample and the reference. The amount of heat Q necessary to maintain the sample at the same temperature as the reference is determined. The amount of heat supplied to/removed from the reference $Q_R$ serves as a reference value.

If the sample undergoes an endothermic phase transformation, an additional amount of heat Q must be supplied to maintain the sample at the same temperature as the reference. If an exothermic phase transformation takes place, an amount of heat Q must be removed to maintain the sample at the same temperature as the reference. The measurement affords a DSC diagram in which the amount of heat Q supplied to/removed from the sample is plotted as a function of temperature T.

Measurement typically involves initially performing a heating run (H), i.e. the sample and the reference are heated linearly. During the melting of the sample (solid/liquid phase transformation) an additional amount of heat Q must be supplied to maintain the sample at the same temperature as the reference. In the DSC diagram a peak known as the melting peak is then observed.

A cooling run (C) is typically measured after the heating run (H). This involves cooling the sample and the reference linearly, i.e. heat is removed from the sample and the reference, During crystallization/solidification of the sample (liquid/solid phase transformation) a greater amount of heat Q must be removed to maintain the sample at the same temperature as the reference since heat is liberated in the course of crystallization/solidification. In the DSC diagram of the cooling run (C) a peak known as the crystallization peak is then observed in the opposite direction to the melting peak.

In the context of the present invention the heating during the heating run (H) is typically performed at a heating rate of 20 K/min. In the context of the present invention the cooling during the cooling run (C) is typically performed at a cooling rate of 20 K/min.

A DSC diagram comprising a heating run (H) and a cooling run (C) is shown by way of example in FIG. 1. The DSC diagram may be used to determine the onset temperature of melting $(T_M^{onset})$ and the onset temperature of crystallization $(T_C^{onset})$.

To determine the onset temperature of melting $(T_M^{onset})$ a tangent is drawn against the baseline of the heating run (H) at the temperatures below the melting peak. A second tangent is drawn against the first point of inflection of the melting peak at temperatures below the temperature at the maximum of the melting peak. The two tangents are extrapolated until they intersect. The vertical extrapolation of the intersection to the temperature axis indicates the onset temperature of melting $(T_M^{onset})$.

To determine the onset temperature of crystallization $(T_C^{onset})$ a tangent is drawn against the baseline of the cooling run (C) at the temperatures above the crystallization peak. A second tangent is drawn against the point of inflection of the crystallization peak at temperatures above the temperature at the minimum of the crystallization peak. The two tangents are extrapolated until they intersect. The vertical extrapolation of the intersection to the temperature axis indicates the onset temperature of crystallization $(T_C^{onset})$.

The sintering window (W) results from the difference between the onset temperature of melting $(T_M^{onset})$ and the onset temperature of crystallization $(T_C^{onset})$. Thus:

$$W = T_M^{onset} - T_C^{onset}.$$

In the context of the present invention, the terms "sintering window (W)", "size of the sintering window (W)" and "difference between the onset temperature of melting $(T_M^{onset})$ and the onset temperature of crystallization $(T_C^{onset})$" have the same meaning and are used synonymously.

The present invention is more particularly elucidated by the examples which follow without, however, limiting said invention thereto.

Production of the Extruded Mixtures (eM)

In an extruder polyamide 6 and Irganox 1098 (N,N'-1,6-hexanediylbis[3,5-bis(1,1-dimethylethyl)-4-hydroxy) were compounded to obtain an extruded mixture (eM1) comprising polyamide 6 having a content of 0.4% by weight of Irganox 1098 based on the total weight of the extruded mixture (eM1).

Also produced was a second extruded mixture (eM2) comprising polyamide 6 having a content of 0.3% by weight of Spezialschwarz (carbon black) based on the total weight of the second extruded mixture (eM2)

Production of the Polyamide Powders (PP)

The extruded mixtures (eM1) and (eM2) were subsequently dissolved in the solvents (SV) and then precipitated therefrom to obtain the polyamide powder (PP). In the inventive examples E1 and E2 the first extruded mixture (eM1) and the second extruded mixture (eM2) were each dissolved in a mixture of caprolactam in water (caprolactam content 42% by weight) and subsequently precipitated therefrom. In the comparative examples V1 and V2 the extruded mixtures (eM1) and (eM2) were each dissolved in ethanol and subsequently precipitated therefrom. The results are reported in table 1 which follows:

TABLE 1

| Example No. | Procedure | Bulk density [g/mol] | Fines fraction < 10 μm | Particle shape |
|---|---|---|---|---|
| E1 | 25 g of eM1 in 250 g of 42.5% caprolactam in water | 0.43 | 0% | round; fine porosity; very uniform |
| V1 | 25 g of eM2 in 250 g of EtOH | 0.18 | 7% | angular; nonuniform; very coarse-celled porosity |
| E2 | 25 g of eM2 in 250 g of 42.5% caprolactam in water | 0.42 | 2% | round; fine porosity; very uniform |
| V2 | 25 g of eM2 in 250 g of EtOH | 0.14 | 8% | angular; nonuniform; very coarse-celled porosity |

The inventive examples E1 and E2 show that the process according to the invention affords polyamide particles (PP) having a markedly higher bulk density. The process according to the invention for producing polyamide powders (PP) moreover markedly reduces the content of fines fraction. Furthermore, the polyamide particles produced according to the invention have a more uniform particle shape.

The invention claimed is:

1. A process for producing a polyamide powder (PP) comprising at least one semicrystalline polyamide (P) and at least one additive (A) selected from the group consisting of inorganic pigments and stabilizers, comprising the steps of
   a) compounding the at least one semicrystalline polyamide (P) and the at least one additive (A) in an extruder to obtain a compounded mixture (cM) comprising the at least one semicrystalline polyamide (P) and the at least one additive (A),
   b) extruding the compounded mixture (cM) obtained in step a) from the extruder to obtain an extruded mixture (eM) comprising the at least one semicrystalline polyamide (P) and the at least one additive (A),
   c) introducing the extruded mixture (eM) obtained in step b) into a solvent (SV) to obtain a first suspension (S1) comprising the extruded mixture (eM) and the solvent (SV), wherein the solvent (SV) comprises lactam and water,
   d) heating the first suspension (S1) obtained in step c) to a first temperature (T1) wherein the at least one semicrystalline polyamide (P) present in the extruded mixture (eM) dissolves in the solvent (SV) to obtain a mixture (G) comprising the at least one semicrystalline polyamide (P) dissolved in the solvent (SV) and the at least one additive (A),
   e) cooling the mixture (G) obtained in step d) to a second temperature (T2) wherein the at least one semicrystalline polyamide (P) crystallizes to obtain a second suspension (S2) comprising the polyamide powder (PP) suspended in the solvent (SV), and
   f) separating the polyamide powder (PP) from the second suspension (S2) obtained in step e).

2. The process according to claim 1, wherein in step d) the first suspension (S1) obtained in step c) is heated to a first temperature (T1) in the range from 140° C. to 200° C.

3. The process according to claim 1, wherein in step e) the mixture (G) obtained in step d) is cooled to a second temperature (T2) in the range from 100° C. to 140° C.

4. The process according to claim 1, wherein the first suspension (S1) obtained in step c) comprises in the range from 1% to 25% by weight of the extruded mixture (eM) and in the range from 75% to 99% by weight of the solvent (SV) based on the total weight of the first suspension (S1).

5. The process according to claim 1, wherein the extruded mixture (eM) obtained in step b) comprises in the range from 0.05% to 5% by weight of the at least one additive (A) based on the total weight of the extruded mixture (eM).

6. The process according to claim 1, wherein the extruded mixture (eM) obtained in step b) comprises in the range from >5% to 50% by weight of the at least one additive (A) based on the total weight of the extruded mixture (eM).

7. The process according to claim 1, wherein the at least one semicrystalline polyamide (P) is selected from the group consisting of PA 4, PA 6, PA 7, PA 8, PA 9, PA 11, PA 12, PA 46, PA 66, PA 69, PA 610, PA 612, PA 613, PA 1212, PA, 1313, PA 6T, PA MXD6, PA 6/6T, PA 6/61, PA 6/6I6T, PA 6.36, PA 6/66, PA 6/12, PA 66/6/610, PA PACM 12, PA 61/6T/PACM and copolyamides of two or more of the abovementioned polyamides.

8. The process according to claim 1, wherein the stabilizers are selected from the group consisting of sterically hindered phenols, sterically hindered amines, phosphites and copper stabilizers.

9. The process according to claim 1, wherein at least the mixture (G) is stirred with a stirrer during step e), wherein the specific power input of the stirrer into the mixture (G) is in the range from 100 to 500 W/m$^3$.

10. The process according to claim 1, wherein in the extrusion during step b) the compounded mixture (cM) is pelletized to a particle size in the range from 0.5 to 6 mm.

11. The process according to claim 1, wherein inorganic pigments are selected from the group consisting of carbon black and metal oxides.

12. The process according to claim 7, wherein the stabilizers are selected from the group consisting of sterically hindered phenols, sterically hindered amines, phosphites and copper stabilizers.

13. The process according to claim 7, wherein inorganic pigments are selected from the group consisting of carbon black and metal oxides.

14. The process according to claim 12, wherein in the extrusion during step b) the compounded mixture (cM) is pelletized to a particle size in the range from 0.5 to 6 mm.

15. The process according to claim 13, wherein in the extrusion during step b) the compounded mixture (cM) is pelletized to a particle size in the range from 0.5 to 6 mm.

* * * * *